(12) United States Patent
Austin (10) Patent No.: US 9,946,441 B2
(45) Date of Patent: Apr. 17, 2018

(54) COMPUTERIZED SYSTEM AND METHOD FOR CREATIVE FACILITATION AND ORGANIZATION

(71) Applicant: Kai Austin, Needham, MA (US)

(72) Inventor: Kai Austin, Needham, MA (US)

( * ) Notice: Subject to any disclaimer, the term of this patent is extended or adjusted under 35 U.S.C. 154(b) by 140 days.

(21) Appl. No.: 14/704,941

(22) Filed: May 5, 2015

(65) Prior Publication Data

US 2016/0328361 A1 Nov. 10, 2016

(51) Int. Cl.
| | |
|---|---|
| *G06F 17/00* | (2006.01) |
| *G06F 3/0484* | (2013.01) |
| *G06F 17/22* | (2006.01) |
| *G06F 17/24* | (2006.01) |
| *G06Q 10/06* | (2012.01) |

(52) U.S. Cl.
CPC ........ *G06F 3/0484* (2013.01); *G06F 17/2241* (2013.01); *G06F 17/245* (2013.01); *G06Q 10/06316* (2013.01)

(58) Field of Classification Search
CPC .. G06F 17/211; G06F 17/2205; G06F 3/0484; G06F 17/2241; G06F 17/245
USPC ......................................................... 715/243
See application file for complete search history.

(56) References Cited

U.S. PATENT DOCUMENTS

| | | | | |
|---|---|---|---|---|
| 5,604,861 | A | * | 2/1997 | Douglas ................ G06F 3/0483 715/776 |
| 5,799,157 | A | | 8/1998 | Escallon |
| 6,779,151 | B2 | | 8/2004 | Cahill et al. |
| 6,988,241 | B1 | | 1/2006 | Guttman et al. |
| 7,487,464 | B2 | * | 2/2009 | Grotjohn ............... G06F 3/0483 715/234 |
| 7,710,999 | B2 | * | 5/2010 | Bolder ................. G06Q 10/109 370/465 |
| 8,553,039 | B1 | * | 10/2013 | Boice .................... G06T 11/206 345/418 |
| 2005/0100136 | A1 | * | 5/2005 | Kawatsu ................ A61B 6/463 378/207 |
| 2005/0278624 | A1 | * | 12/2005 | Nishikawa .............. G06T 11/60 715/249 |
| 2006/0248442 | A1 | * | 11/2006 | Rosenstein ............. G06F 17/24 715/205 |
| 2007/0097022 | A1 | * | 5/2007 | Willebrand ............... G06F 8/20 345/10 |
| 2009/0234890 | A1 | * | 9/2009 | Lee .................... G06F 17/30994 |
| 2009/0322774 | A1 | * | 12/2009 | Hosoi .................... G09G 5/363 345/581 |
| 2010/0329577 | A1 | * | 12/2010 | Kitai ....................... G06T 11/60 382/218 |
| 2011/0113336 | A1 | * | 5/2011 | Gunatilake ....... H04N 21/44008 715/723 |
| 2012/0173970 | A1 | * | 7/2012 | Gremillion ........... G06F 17/211 715/246 |

(Continued)

OTHER PUBLICATIONS

Choi et al., Motion-Compensated Frame Interpolation Using Bilateral Motion Estimation and Adaptive Overlapped Block Motion Compensation, IEEE 2007, pp. 407-416.*

(Continued)

*Primary Examiner* — Cong-Lac Huynh (57) ABSTRACT

A computerized system and method for facilitating and organizing the creative process of planning events either along one line, or multiple in parallel, with a designated order but not at specific points in time.

4 Claims, 6 Drawing Sheets

(56) References Cited

U.S. PATENT DOCUMENTS

| | | | | |
|---|---|---|---|---|
| 2012/0190456 | A1* | 7/2012 | Rogers | G06Q 10/00 463/42 |
| 2013/0151952 | A1* | 6/2013 | Yamamoto | G06F 17/21 715/243 |
| 2013/0262092 | A1* | 10/2013 | Wasick | G06F 17/28 704/9 |
| 2014/0282013 | A1* | 9/2014 | Amijee | G06F 17/30056 715/732 |
| 2016/0292133 | A1* | 10/2016 | Elings | G06F 17/2229 |
| 2016/0328789 | A1* | 11/2016 | Grosz | G06F 3/0484 |

OTHER PUBLICATIONS

Adya et al., Consistent Placement of Macro-Blocks Using Floorplanning and Standard-Cell Placement, ACM 2002, pp. 12-17.*

* cited by examiner

COMPUTERIZED SYSTEM AND METHOD FOR CREATIVE FACILITATION AND ORGANIZATION

BACKGROUND

There exists no sufficient plot building software for writers that addresses multiple overlapping plotlines, especially in the cases where a story has multiple characters. Normally writers would resort to using story boards, spreadsheets, or software that plots out their book along either a timeline or sequentially is it may occur in a book. This is a problem however because not all events which occur in a book are sequential. Characters live their own separate lives which may not be included as scenes within a book. And resorting to the more primitive usage of a physical storyboard, such as with index cards, can be mentally taxing, disorganized, and easily to lose if the story board is accidentally shuffled.

SUMMARY

A computerized system for creative facilitation and organization comprising a computer having a display, a storage section on the display for the placement of a block of user inputted text or data, a linear placement line which functions where events can occur are specific points or between specific points, at least one columned grid, or outline section, with a uniquely named identifier designated by the user and multiple rows each of which will act as point in linear placement line, the option for the user create more than one outline section, or to include from a list of pre-defined, unique named identifiers, means for adding or removing rows to the grids, whether to all grids universally or each grid respectively, blocks configured to contain user input which may be transferred between the storage section and the grid and vice versa, and can be increased or decreased in size to cover the space between two points on the linear line, and a means of storing content and location of blocks.

A computerized method comprising displaying computerized user interface that includes a storage section and at least one gridded column, or outline section, selecting either the storage section or a row in the outline section or sections, inputting text or data into a computerized data or sequence block, moving text or data from storage section to gridded column or vice versa, for text and data blocks within the outline section, adjusting height of text or data block, and saving or storing text and data, and their respective locations, into a computer database.

DETAILED DESCRIPTION

The embodiments described herein relate to a computerized, visual system and method of facilitating and/or organizing the creative process and planning of events with a strict order but undesignated time span, some events of which may be overlapping. A non-limiting example of usage would be an author working on a plot of a book, especially one with multiple characters who have their own respective parallel plots, and moving around events within a story to ensure coherency.

More specifically the system and method provide a means for creative facilitation and organization by allowing users to brainstorm ideas, specifically events, using blocks of text and/or data (text/data blocks) inputted by the user, which can then be placed along an event line. When a text/data block is positioned in an outline section along the event line, it is then referred to as a sequence block. The events are represented by sequence blocks in at least one gridded column (comprised of multiple rows) to reflect the order in which the events occur. Each row represents a point on the event line, and the points on the event line represent the progression of events. The events themselves however do not necessarily have specific moments in time and the block placement is merely a representation of sequence. Multiple events can occur during other events as designated by the addition of more columns, with each column symbolic of its own linear line that runs parallel to all others. Events can be moved between the brainstorm area and between the columns. They can be adjusted in size to take up more or less space in the sequence of events. They can also have their contents and text changed and edited by the user as needed.

Figure 1:
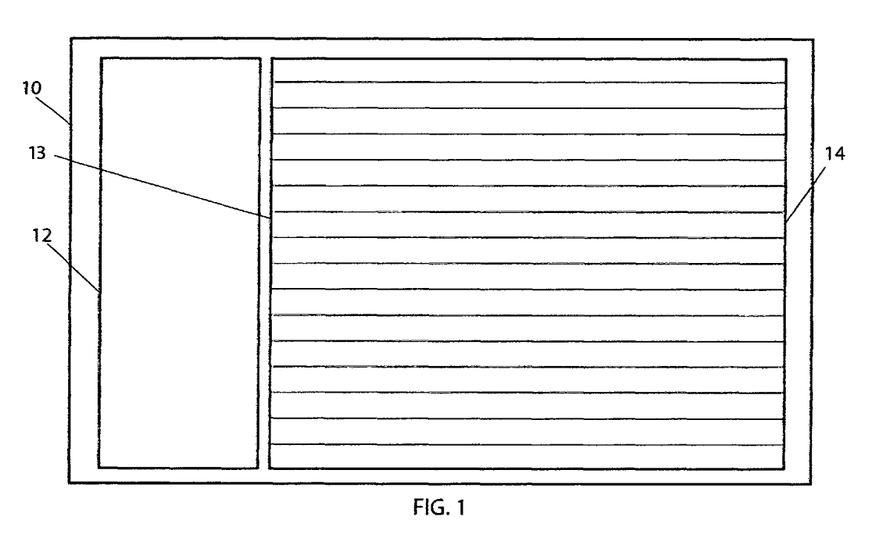
FIG. 1 shows a layout of a first embodiment.

Referring to the drawings, FIG. 1 shows the layout of the computerized system in its most basic form before any user input has been added. The computer screen is designated as 10. There are two sections, the one on the left being the storage section 12 for brainstorming and miscellaneous user input, and the larger one on the right being the gridded column or outline section 14 to which a user may assign an identifying name. In the version depicted in FIG. 1; the event line 13 extends vertically along one side of the outline section 14, and is shown in FIG. 1 as extending along the left side of the outline section 14. The user may click in either section to create a new block of text.

Figure 2:
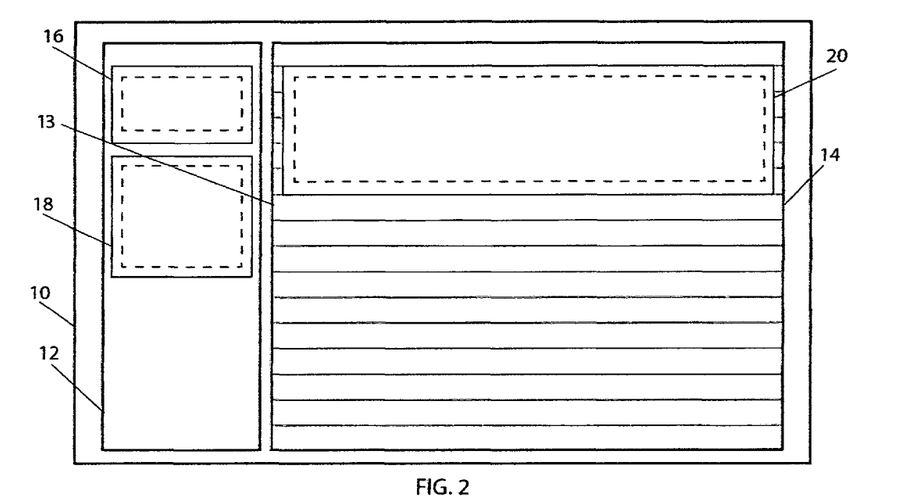
FIG. 2 shows how blocks of text are arranged in the first embodiment.

FIG. 2 shows how blocks of text are arranged within the sections. The storage section 12 contains a first text/data block 16 and a second text/data block 18, with the user's respective input symbolized by dashed lines. When a user enters input into the storage section 12, it is appended at the bottom of the storage section 12 in a block. A user can also click on the block to edit its contents. When a user clicks on a row (or point along the linear line which it symbolizes) and enters input, the input is saved into a block starting at that row. The user may specify how many rows (how much space along the linear line) the input takes. The outline section 14 contains a sequence block 20 with the user's respective input for that block symbolized by dashed lines.

Figure 3:
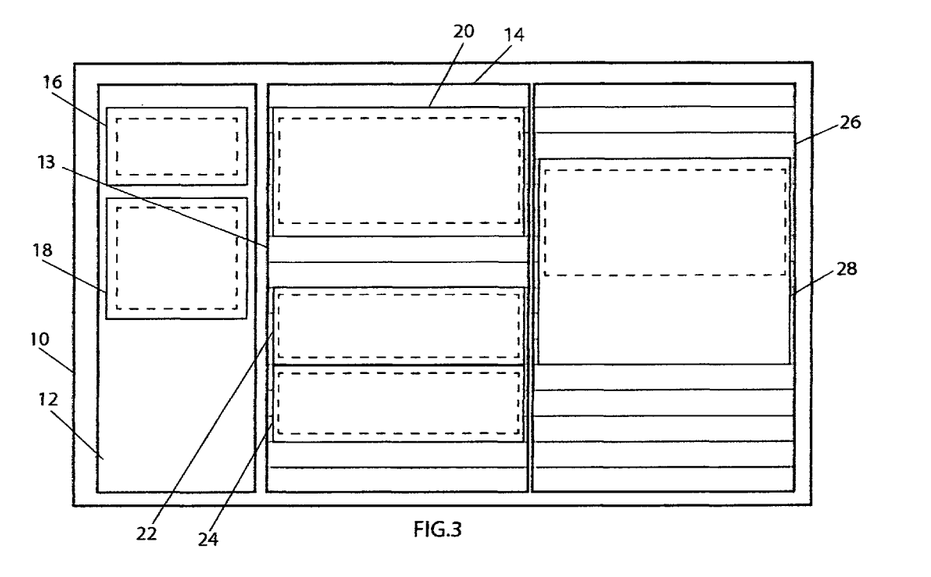
FIG. 3 shows an addition of columns in the first embodiment as well as alternative text blocks can be arranged.

FIG. 3 shows how more columns can be added with input of their own and more input can be added, stacked, etc. In FIG. 3, there is an additional outline section 26 included to the right of the outline section 14. The user can add the additional column by clicking to the left, right, or between displayed outline sections, and a new outline section, to which the user may assign an identifying name, will be inserted accordingly. The outline section 26 and outline section 14 both serve as independent grids which allow for the overlapping of sequence blocks relative to the direction that the event line 13 extends along the display, such as outline section 14's sequence blocks 20, 22, 24, and the outline section 26's sequence block 28. The user may also adjust the size of each sequence block in its respective outline section to specify how much it overlaps with the sequence blocks of events in other outline sections. Such is the case with the sequence section 28 whose height is different from the size of the user's input it contains.

Figure 4:
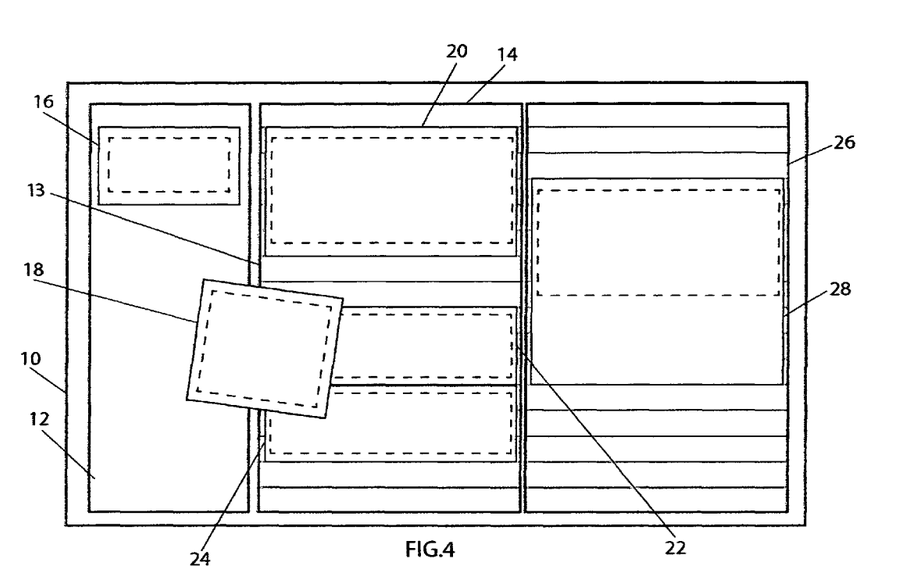
FIG. 4 shows movement of text block between the storage section and the outline section.
Figure 5:
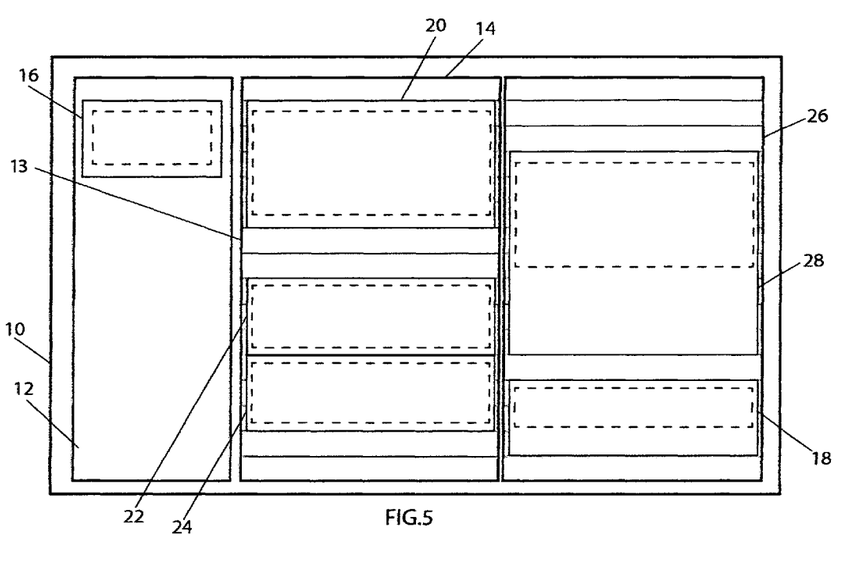
FIG. 5 shows the layout after a block has been moved from one section to another.

FIGS. 4-5 shows the action and result of moving input between the storage section and the outline sections. The data block 18 is taken from the storage section in FIG. 4 and placed in the outline section 26 as shown in FIG. 5. The new sequence block adapts to fill out the width of the outline section, and as with the sequence block 28, its height is not subject to the user input it contains. All sequence and data blocks can be dragged where needed to help facilitate the organizational process and allow for rearranging blocks as needed.

Figure 6:
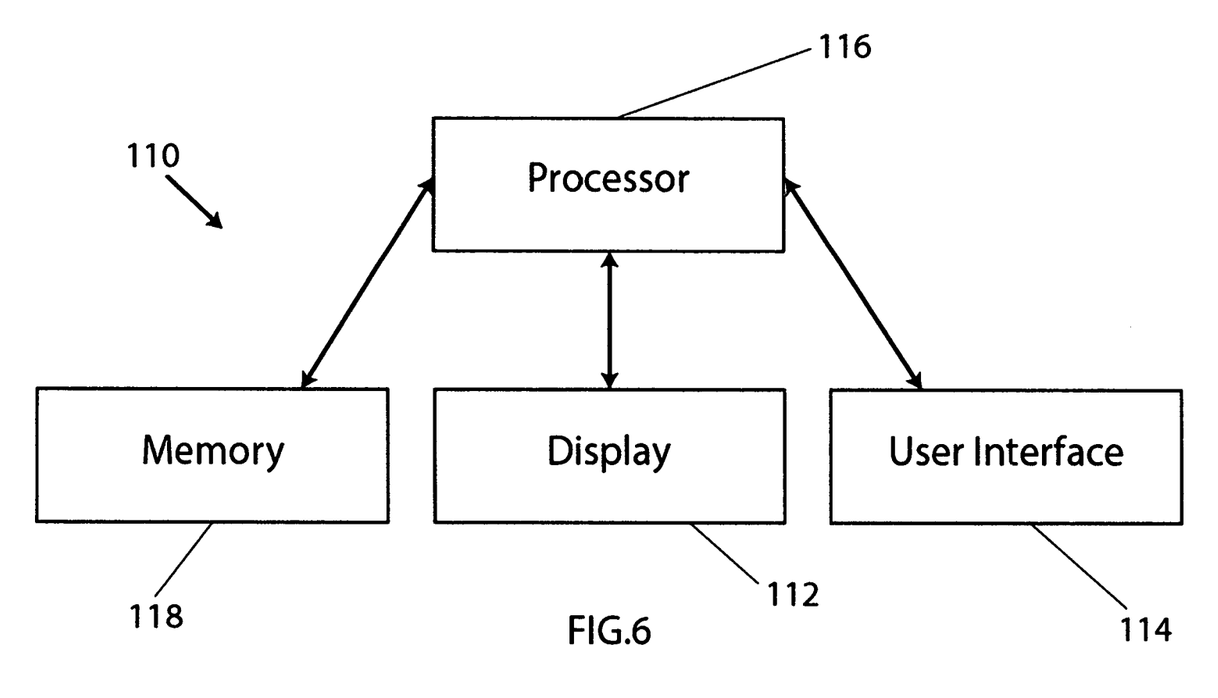
FIG. 6 schematically shows the system described herein.

FIG. 6 shows a computer 110 for use in executing the method and system described herein. The computer 110 includes a display 112, a user interface 114, a processor 116, and a memory 118. The user acts primarily with in user interface 114 and receives feedback from the display 112. The processor 116 uses the user's actions in the interface 114 to modify the display 112 and sends the user's actions and stores updated data to the database memory 118.

The system shown in FIGS. 1-4 above can be formed by writing computer code that provides for the initial screen display shown in FIG. 1. The program is written such that when a user clicks or taps anywhere in the storage section, a new data block appears underneath existing data blocks, and when the user clicks or taps one of the rows in outline section, a new sequence block appears in that respective row. The user may input text or data into their respective blocks as needed. Sequence blocks by default will have a height showing all containing user input. In general, each data and sequence block is configured to accept alphanumeric characters. Users may also click on their input to update its contents, or click and drag the blocks between the storage section and the outline section or sections, or click on the top or bottom of the sequence blocks to adjust the height. They may also use a button or click to the left or right of any outline section to insert a new outline section or insert rows into the respective outline sections. All outline sections have their own respective identifying names which a user can change at any time as needed.

The precise format of the computer program will depend upon on the programming language used, the database, the number of columns a user has, and the number of data and sequence blocks a user has. There is no set maximum number of columns, however if screen size proves too small to display all, the user may horizontally scroll through them to bring desired column into view. There is also no set maximum number of data or sequence blocks a user may have, however if screen size proves too small to display all, the user may vertically scroll in the storage section and outline section, respectively.

One preferred embodiment for using the system described herein is for outlining the plot and events of a book, screen play, or other media medium, especially those with multiple characters. First, the user accesses or opens a computer program or website application which displays a user interface that includes a storage section and at least one gridded column/outline section represented by a user specified main character or primary plotline, similar to that shown in FIG. 1. Second, the user clicks on the storage section and inputs text into a block explaining a summary of an event expected to occur within the book, but do not yet where when in the book the event will occur or to whom the event applies. Alternatively, the user clicks on a row in the outline section where they know an event to occur and inputs text into a block. This results in a configuration similar to FIG. 2.

Third, a user adds in another outline section, naming it after a character within their book to which the outline section to which it applies. They then add in more blocks for that new outline section, adjusting their height to show them overlapping with events which occur within the original outline section. This results in a similar configuration to FIG. 3. Fourth, a user clicks on one of the events saved in the storage section, and knowing where and for whom they wish for the event to occur, insert it into the relevant outline section and row. Such a movement is shown in FIG. 4-5. Finally, a user realizes they need an additional row between blocks, so they may insert a new row in desired position accordingly. These steps are repeated, not necessarily in order, until the user leaves the program.

A number of alternatives, modifications, variations, or improvements therein may be subsequently made by those skilled in the art, which are also intended to be encompassed by the following claims.

What is claimed is:

1. A system comprising a computer, the computer comprising:
   a. a display for forming and moving text/data blocks, the display including:
      a storage section for placing blocks of user inputted text or data;
      an event line along which the blocks of user inputted text or data can be arranged;
      an outline section including at least one columned grid with a uniquely named identifier designated by the user and multiple rows, each of which will act as a point along the event line;
      an option for the user to create a number of additional outline sections from the outline section;
      wherein the blocks configured to contain the user inputted text or data are movable between the storage section and the grid, and are configured to be increased or decreased in size to cover the space between two points on the event line, and
      wherein the display contains at least two independent outline sections which allow for the overlapping of sequence blocks along the event line; and
   b. a computer storage for storing content and location of blocks.

2. The system of claim 1, wherein the storage section is positioned to the left of the at least two independent outline sections.

3. A system for organizing multiple plots while writing a story, the system comprising a computer, the computer comprising:
   a. a display for forming and moving text/data blocks, the display including:
      a storage section for placing of a plurality of text/data blocks;
      an event line that can be extended vertically;
      a first outline section comprising at least a first column, the first outline section having a uniquely named identifier designated by the user and multiple rows, each of which is aligned with a point along the event line;
      a second outline section comprising at least a second column that is horizontally spaced from the first column, the second outline section having a uniquely named identifier designated by the user and multiple rows, each of which is aligned with a point along the event line; and
      a user interface allowing the user to add and remove rows in the first and second outline sections;

wherein the text/data blocks are configured to be transferred among the storage section, the first outline section, and the second outline section, and are configured to be increased or decreased in size to cover the space between two points in the event line; and wherein the display enables a user to overlap text/data blocks in the first outline section along the event line with text/data blocks positioned in the second outline section in order to show a relative sequence of the multiple plots in the story;

and b. a computer storage configured to store content and location of text/data blocks.

4. The system of claim 3, wherein the storage section remains independent of the event line.

\* \* \* \* \*